(12) United States Patent
Hattori et al.

(10) Patent No.: US 8,927,071 B2
(45) Date of Patent: *Jan. 6, 2015

(54) PRESSURE-SENSITIVE ADHESIVE COMPOSITION, PRESSURE-SENSITIVE ADHESIVE AND OPTICAL FILM

(75) Inventors: Shinya Hattori, Tochigi (JP); Hiroto Nakano, Tochigi (JP); Akira Kamoi, Tochigi (JP); Naomi Furue, Tochigi (JP); Shuhei Masuda, Tochigi (JP); Hideki Miyazaki, Tochigi (JP); Masahito Saito, Tochigi (JP)

(73) Assignee: Nippon Carbide Industries Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/061,652

(22) PCT Filed: Aug. 6, 2009

(86) PCT No.: PCT/JP2009/063966
§ 371 (c)(1),
(2), (4) Date: Jun. 3, 2011

(87) PCT Pub. No.: WO2010/024103
PCT Pub. Date: Mar. 4, 2010

(65) Prior Publication Data
US 2011/0236605 A1    Sep. 29, 2011

(30) Foreign Application Priority Data

Sep. 1, 2008  (JP) ................................ 2008-223347

(51) Int. Cl.
*C09K 19/00* (2006.01)
*C08G 18/62* (2006.01)
(Continued)

(52) U.S. Cl.
CPC ............ *C08G 18/6216* (2013.01); *C08G 18/10* (2013.01); *C08G 18/6229* (2013.01);
(Continued)

(58) Field of Classification Search
USPC ...................... 428/1.55, 355 R, 255 AC, 1.54; 427/385.5; 525/375, 329, 7, 330.3, 525/329.7, 522; 524/558; 156/60; 349/122
See application file for complete search history.

(56) References Cited

U.S. PATENT DOCUMENTS 4,565,730 A    1/1986  Poth et al.
5,098,956 A    3/1992  Blasko et al.
(Continued)

FOREIGN PATENT DOCUMENTS

JP    08-259922 A    10/1996
JP    09-113724      5/1997
(Continued)

OTHER PUBLICATIONS

International Preliminary Report on Patentability together with the Written Opinion dated Apr. 21, 2011 from related application PCT/JP2009/063966.

(Continued)

*Primary Examiner* — Gwendolyn Blackwell
*Assistant Examiner* — Ruiyun Zhang
(74) *Attorney, Agent, or Firm* — Scully, Scott, Murphy & Presser, P.C.

(57) ABSTRACT

A pressure-sensitive adhesive composition which is excellent in durability under high temperature and humidity conditions and can thus inhibit bright defect even when applied to a large-sized optical film; a pressure-sensitive adhesive; and an optical film. A pressure-sensitive adhesive composition including an acrylic copolymer (A) bearing a reactive functional group, an acrylic copolymer (B) and an isocyanate compound (C), wherein the quantity of the isocyanate compound (C) is 5 to 30 parts by weight per 100 parts by weight of a mixture of the acrylic copolymer (A) and the acrylic copolymer (B) and the elongation at break and 200% modulus as determined at 25 degrees C. by the tensile test are 300 to 1000% and 0.2 to 3 $N/mm^2$ respectively.

11 Claims, 2 Drawing Sheets

(51) Int. Cl.
*C08G 18/10* (2006.01)
*C08G 18/76* (2006.01)
*C09J 7/02* (2006.01)
*C09J 133/06* (2006.01)
*C09J 133/08* (2006.01)
*C09J 175/04* (2006.01)
*C08F 220/18* (2006.01)
*C08L 33/08* (2006.01)
*G02B 5/30* (2006.01)

(52) U.S. Cl.
CPC ....... *C08G 18/6254* (2013.01); *C08G 18/7621* (2013.01); *C09J 7/0246* (2013.01); *C09J 133/064* (2013.01); *C09J 133/066* (2013.01); *C09J 133/08* (2013.01); *C09J 175/04* (2013.01); *C08F 2220/1825* (2013.01); *C08G 2170/40* (2013.01); *C08L 33/08* (2013.01); *C08L 2205/02* (2013.01); *C09J 2433/00* (2013.01); *G02B 5/3033* (2013.01)
USPC ............ 428/1.55; 428/1.54; 428/355 R; 525/329.7; 525/330.3

(56) References Cited

U.S. PATENT DOCUMENTS

| 7,285,313 | B2* | 10/2007 | Kim et al. | 428/1.55 |
|---|---|---|---|---|
| 2001/0031835 | A1* | 10/2001 | Ohrui et al. | 525/329.7 |
| 2003/0029544 | A1 | 2/2003 | Noguchi et al. | |
| 2005/0239965 | A1 | 10/2005 | Kim et al. | |
| 2010/0247940 | A1 | 9/2010 | Takahashi et al. | |
| 2011/0043737 | A1 | 2/2011 | Kim et al. | |
| 2012/0120347 | A1 | 5/2012 | Takahashi et al. | |

FOREIGN PATENT DOCUMENTS

| JP | 10-054906 A | 2/1998 |
|---|---|---|
| JP | 10-279907 | 10/1998 |
| JP | 2001-335767 | 12/2001 |
| JP | 2003-049141 | 2/2003 |
| JP | 2003-193014 | 7/2003 |
| JP | 2003-329832 | 11/2003 |
| JP | 2004-002782 | 1/2004 |
| JP | 2004-224873 | 8/2004 |
| JP | 2005-115028 | 4/2005 |
| JP | 2005-146151 | 6/2005 |
| JP | 2005-298724 | 10/2005 |
| JP | 2006-036843 A | 2/2006 |
| JP | 2006-133606 | 5/2006 |
| JP | 2006-282687 | 10/2006 |
| JP | 2007-119667 | 5/2007 |
| JP | 2007-518862 A | 7/2007 |
| JP | 2008-31214 A | 2/2008 |
| JP | 2008-045041 | 2/2008 |
| JP | 2008-069202 | 3/2008 |
| JP | 2008-144126 A | 6/2008 |
| JP | 2008-280375 | 11/2008 |
| JP | 2009-108113 | 5/2009 |
| JP | 2009-221324 | 10/2009 |
| WO | 2008/053931 A1 | 5/2008 |
| WO | 2009/091162 A2 | 7/2009 |

OTHER PUBLICATIONS

International Search Report dated Nov. 2, 2009.
Japanese Notification dated Mar. 12, 2013 together with partial English-language translation from related Japanese Patent Application No. JP 2008-330230.
Japanese Information Statement dated Feb. 27, 2013 together with partial English-language translation from related Japanese Patent Application No. JP 2008-330230.
Japanese Notification dated Jun. 25, 2013 together with partial English-language translation from related Japanese Patent Application No. JP 2008-330230.
Japanese Notification and Information Statement dated Jun. 18, 2013 together with partial English-language translation from related Japanese Patent Application No. JP 2008-330230.
Japanese Notification and Information Statement mailed Oct. 15, 2013 together with English-language translation from related Japanese Patent Application No. JP 2008-330230.
Extended European Search Report mailed Nov. 5, 2012 in European counterpart, European Patent Application No. 09809757.

* cited by examiner

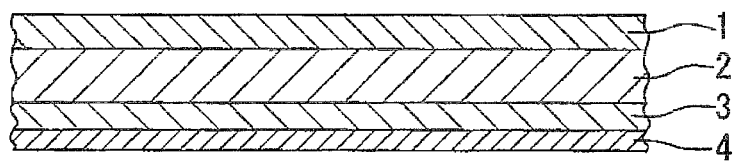
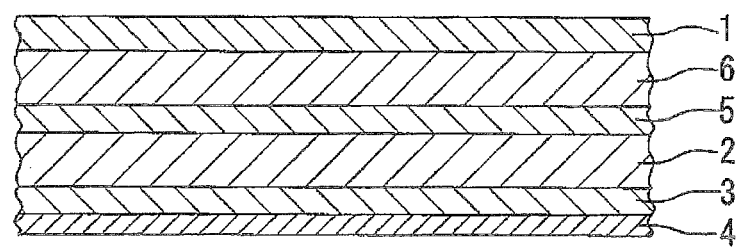

PRESSURE-SENSITIVE ADHESIVE COMPOSITION, PRESSURE-SENSITIVE ADHESIVE AND OPTICAL FILM

TECHNICAL FIELD

The present invention relates to a pressure-sensitive adhesive composition, a pressure-sensitive adhesive and an optical film. In particular, the present invention relates to a pressure-sensitive adhesive composition comprising acrylic copolymers having a reactive functional group, a pressure-sensitive adhesive and an optical film.

BACKGROUND ART

Usually, a liquid crystal display device comprises a liquid crystal cell having a structure that a liquid crystal component oriented in a predetermined direction is sandwiched between two supporting substrates of glass or the like, and an optical film such as a polarizing film, a phase difference film and a luminance improving film, and a pressure-sensitive adhesive is often used when the optical films are laminated with each other or adhered to the liquid crystal cell.

The liquid crystal display device is broadly used as a display device such as a personal computer, a television and a car navigation. In accordance with this, it is needed for a pressure-sensitive adhesive to be excellent in durability even though it is used under a severe environment such as high temperature and humidity conditions, namely not to cause separation, occurrence of air bubbles or the like even though it is used for long periods of time. In addition, the optical film is subjected to a large dimensional change such as shrinkage or expansion under the severe environment such as high temperature and humidity conditions, but stress occurring due to the dimensional change can not be relaxed by the pressure-sensitive adhesive layer, so that residual stress of the optical film becomes uneven. As a result, so-called "bright defect" has been problematic, the "bright defect" meaning that a light leaks from the peripheral part of liquid crystal display device so as to whiten the part.

In order to solve the above-mentioned problem, a pressure-sensitive adhesive has been proposed, that is configured to have a stress relaxing property by adding a low molecular weight polymer to a pressure-sensitive adhesive composition. For example, a pressure-sensitive adhesive composition for polarization plate has been disclosed, that comprises a high molecular weight acrylic copolymer, a low molecular weight acrylic copolymer having weight-average molecular weight of not more than 30,000 and a polyfunctional compound (for example, refer to Patent Literature 1). The pressure-sensitive adhesive composition described in Patent Literature 1 follows the dimensional change of polarization plate, so that occurrence of bright defect can be prevented. However, in the pressure-sensitive adhesive composition described in Patent Literature 1, an additive amount of the low molecular weight acrylic copolymer having weight-average molecular weight of not more than 30,000 is large, thus it is difficult to prevent occurrence of bubbles and separation under high temperature and humidity conditions.

In addition, a pressure-sensitive adhesive composition has been disclosed, that comprises a mixture of a low glass-transition temperature (Tg) acrylic copolymer having a content of a functional group containing monomer of not more than 0.5% by weight and a high Tg acrylic copolymer having a content of a functional group containing monomer of not less than 6% by weight, a crosslinking agent reactive with the functional group and an isocyanate compound, and that has a gel fraction of less than 30% by weight (for example, refer to Patent Literature 2). The pressure-sensitive adhesive composition described in Patent Literature 2 is capable of causing a cohesion force by forming a crosslinking structure in molecules of the high Tg acrylic copolymer, and restraining relation between molecules of the low Tg acrylic copolymer by a multimeric complex of the isocyanate compound. However, although the pressure-sensitive adhesive composition has molecules in which the crosslinking structure is hardly formed so that bright defect is scarcely caused, it has a low cohesion force under high temperature condition, thus it is difficult to prevent separation or occurrence of air bubbles in an evaluation of durability.

In addition, a pressure-sensitive adhesive composition has been disclosed, that comprises an acrylic copolymer having carboxyl group and hydroxyl group and an isocyanate compound added to the acrylic copolymer in an amount of 0.3 to 3 parts by weight (for example, refer to Patent Literature 3). The pressure-sensitive adhesive composition described in Patent Literature 3 has the above-mentioned constitution so that it is excellent in durability and inhibition of bright defect, if the pressure-sensitive adhesive composition is used for a liquid crystal display device having a small size as described in Patent Literature 3. However, if used for a liquid crystal display device having a large size, it is inferior in durability and inhibition of bright defect, thus a pressure-sensitive adhesive composition is needed, that has further excellent durability and is capable of inhibiting bright defect at a higher level.

Furthermore, recently, the optical film becomes also larger in size in accordance with the size increase of liquid crystal display device. Dimensional change such as shrinkage or expansion of the optical film becomes larger in accordance with the size increase, thus higher durability and inhibition of bright defect are needed. A pressure-sensitive adhesive composition having a high cohesion force has been disclosed as a pressure-sensitive adhesive composition satisfying durability even if used for a liquid crystal display device having a large display. For example, a pressure-sensitive adhesive composition for polarization plate has been disclosed, that comprises a mixture of an acrylic copolymer (A) having carboxyl-group or amide group but not having hydroxyl group and an acrylic copolymer (B) having carboxyl-group or amide group and having hydroxyl group, the copolymer (A) and copolymer (B) being mixed in a weight ratio ((A)/(B)) of 20/80 to 50/50 and an isocyanate compound blended to the mixture (for example, refer to Patent Literature 4). However, although the pressure-sensitive adhesive composition described in Patent Literature 4 is capable of preventing occurrence of bubbles and separation under high temperature and humidity conditions, it has insufficient stress relaxation properties, thereby bright defect easily occurs.

PRIOR ART DOCUMENTS

Patent Literature

Patent Literature 1: JP-A-1998 (H10)-279907
Patent Literature 2: JP-A-2006-133606
Patent Literature 3: JP-A-2004-224873
Patent Literature 4: JP-A-1997 (H09)-113724

SUMMARY OF THE INVENTION

Problems to be Solved by the Invention

As mentioned above, it is difficult for the pressure-sensitive adhesive compositions according to Patent Literatures 1 to 4 to provide an optical film capable of simultaneously achieving both of enhancement of durability and inhibition of bright defect. For example, recently, an optical film used for liquid crystal display device having a large display becomes further larger in size, and dimensional change of the optical film under high temperature and humidity conditions becomes larger in accordance with the size increase, so that it is needed for the optical film to enhance durability and inhibit bright defect at a further higher level. However, an optical film capable of sufficiently realizing both of enhancement of durability and inhibition of bright defect has not been provided yet.

Therefore, it is an object of the invention to provide a pressure-sensitive adhesive composition, a pressure-sensitive adhesive and an optical film capable of simultaneously achieving both of enhancement of durability and inhibition of bright defect, in particular, to provide a pressure-sensitive adhesive composition, a pressure-sensitive adhesive and an optical film that is excellent in durability and is capable of inhibiting bright defect under high temperature and humidity conditions even if a liquid crystal display device having a large display is used.

Means for Solving the Problems (1) In order to solve the above-mentioned object, the present invention provides a pressure-sensitive adhesive composition comprising an acrylic copolymer (A) and an acrylic copolymer (B) that have a reactive functional group respectively, and an isocyanate compound (C), wherein the isocyanate compound (C) is added in an amount of 5 to 30 parts by weight per 100 parts by weight of a mixture of the acrylic copolymer (A) and the acrylic copolymer (B), and a pressure-sensitive adhesive layer formed from the pressure-sensitive adhesive composition has the elongation at break and 200% modulus as determined at 25 degrees C. by the tensile test that are 300 to 1000% and 0.2 to 3 N/mm² respectively.

(2) In addition, the above-mentioned pressure-sensitive adhesive composition preferably has a constitution that if the isocyanate compound (C) is added in an amount of 1 equivalent of an isocyanate group per equivalent of the reactive functional group of the acrylic copolymer (A), and a crosslinking film is formed by being cured for 10 days under the environment of 23 degrees C. and 50% relative humidity (RH), the acrylic copolymer (A) has the elongation of not less than 600% at break as determined at 25 degrees C. by the tensile test of the crosslinking film, and if the isocyanate compound (C) is added in an amount of 1 equivalent of an isocyanate group per equivalent of the reactive functional group of the acrylic copolymer (B), and a crosslinking film is formed by being cured for 10 days under the condition of 23 degrees C. and 50% relative humidity (RH), the acrylic copolymer (B) has the elongation of less than 600% at break as determined at 25 degrees C. by the tensile test of the crosslinking film.

(3) In addition, the above-mentioned pressure-sensitive adhesive composition can have a constitution that the acrylic copolymer (A) contains 0.5 to 5% by weight of a carboxyl group containing monomer containing a carboxyl group as the reactive functional group, as a component of the copolymer, and the acrylic copolymer (B) contains 0.1 to 5% by weight of a carboxyl group containing monomer containing a carboxyl group as the reactive functional group, and 0.01 to 5% by weight of a hydroxyl group containing monomer containing a hydroxyl group as the reactive functional group, as components of the copolymer.

(4) In addition, the above-mentioned pressure-sensitive adhesive composition preferably has a constitution that each of the acrylic copolymer (A) and the acrylic copolymer (B) has weight-average molecular weight of 900,000 to 2,500,000.

(5) In addition, the above-mentioned pressure-sensitive adhesive composition preferably has a constitution that the acrylic copolymer (A) and the acrylic copolymer (B) are contained in a weight ratio of 50/50 to 99/1.

(6) In addition, the above-mentioned pressure-sensitive adhesive composition preferably has a constitution that the difference between the solubility parameter ($SP_A$) of acrylic copolymer (A) and the solubility parameter ($SP_B$) of acrylic copolymer (B) is −0.5 to 0.5.

(7) In addition, the above-mentioned pressure-sensitive adhesive composition preferably has a constitution that the relation between the glass-transition temperature ($Tg_A$) of acrylic copolymer (A) and the glass-transition temperature ($Tg_B$) of acrylic copolymer (B) satisfies $Tg_A<Tg_B$.

(8) In addition, the above-mentioned pressure-sensitive adhesive composition preferably has a constitution that the composition further contains an epoxy based crosslinking agent and an aziridine based crosslinking agent.

(9) In addition, in order to solve the above-mentioned object, the present invention provides a pressure-sensitive adhesive comprising the pressure-sensitive adhesive composition according to any one of the above-mentioned (1) to (8).

(10) In order to solve the above-mentioned object, the present invention provides an optical film having a pressure-sensitive adhesive layer formed from the pressure-sensitive adhesive composition according to any one of the above-mentioned (1) to (8).

(11) In order to solve the above-mentioned object, the present invention provides a liquid crystal display device being equipped with the optical film according to the above-mentioned (10).

Advantages of the Invention

In accordance with a pressure-sensitive adhesive composition, a pressure-sensitive adhesive and an optical film according to the present invention, a pressure-sensitive adhesive composition, a pressure-sensitive adhesive and an optical film capable of simultaneously achieving both of enhancement of durability and inhibition of bright defect can be provided, in particular, a pressure-sensitive adhesive composition, a pressure-sensitive adhesive and an optical film that is excellent in durability and is capable of inhibiting bright defect under high temperature and humidity conditions even if a liquid crystal display device having a large display is used can be provided.

BRIEF DESCRIPTION OF THE DRAWINGS

FIG. 1 is a sectional view schematically showing an optical film according to the embodiment;

FIG. 2 is a sectional view schematically showing an optical film according to modification of the embodiment;

Figure 3:
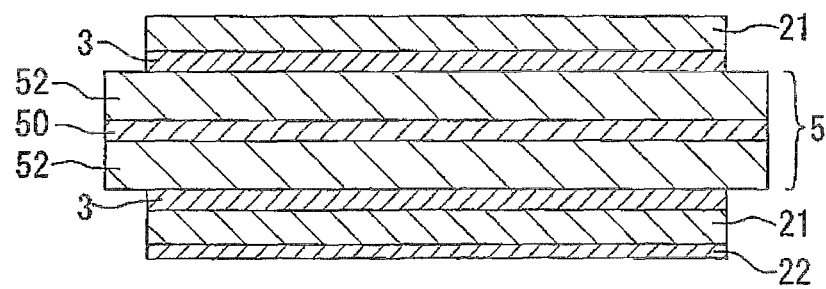
FIG. 3 is a sectional view schematically showing a liquid crystal display device according to the embodiment.

EMBODIMENT FOR CARRYING OUT THE INVENTION (Findings Obtained by the Inventors)

As a result of earnest investigation of the inventors for solving the above-mentioned problem, it has been found out that both of enhancement of durability and inhibition of bright defect can be simultaneously achieved, and in particular, a pressure-sensitive adhesive composition and a pressure-sensitive adhesive effective in an optical film having a large display by using a pressure-sensitive adhesive composition comprising a mixture of an acrylic copolymer (A) having a reactive functional group and simultaneously functioning as a relaxation ingredient, an acrylic copolymer (B) having a reactive functional group and simultaneously functioning as an elastic ingredient different from the acrylic copolymer (A), and an isocyanate compound (C) added to the mixture in a specified amount. In addition, it has been found out by the inventors that both of enhancement of durability and inhibition of bright defect can be simultaneously achieved by using the acrylic copolymer (A) and acrylic copolymer (B) having a predetermined elongation respectively as raw materials of pressure-sensitive adhesive composition, in case of measuring an elongation at break as determined by a tensile test after 1 equivalent of the isocyanate compound (C) is added per equivalent of the acrylic copolymer (A) and the acrylic copolymer (B) so as to be crosslinked, and by configuring the pressure-sensitive adhesive composition or the pressure-sensitive adhesive so as to confine the elongation at break and 200% modulus thereof determined by the tensile test to a predetermined value respectively.

Hereinafter, terms in the embodiment is defined. First, a state that nets of crosslinked polymers different from each other penetrate each other so as to be intertwined with each other intricately is referred to as "interpenetrating polymer network (IPN) structure". In the IPN structure, different crosslinked polymers are intertwined with each other so as to be physically restrained with each other (hereinafter, the intertwined structure like this is referred to as "physical crosslinking"), a crosslinking due to chemical bonding between the different crosslinked polymers (hereinafter, may be referred to as "chemical crosslinking") does not exist.

Second, the inventors have found out a structure that the crosslinked polymers (namely, a crosslinking construction formed due to chemical crosslinking between the acrylic copolymer (A) and the acrylic copolymer (B)) and a multimeric complex formed by a reaction of the isocyanate compound with water are intertwined with each other so as to form physical crosslinking, and simultaneously the multimeric complex chemically forms a crosslinking between the crosslinked polymers. Hereinafter, the structure like this may be referred to as "pseudo IPN structure". And, it has been found out by the inventors that a pressure-sensitive adhesive composition having the pseudo IPN structure provides excellent characteristics.

In particular, it has been found out by the inventors that the pressure-sensitive adhesive composition comprising an acrylic copolymer (A), an acrylic copolymer (B) having an elongation different from that of the acrylic copolymer (A) and an isocyanate compound (C) has 5 crosslinking configurations of chemical crosslinking between the acrylic copolymers (A) with each other, chemical crosslinking between the acrylic copolymer (A) and the acrylic copolymer (B), chemical crosslinking between the acrylic copolymers (B) with each other, physical crosslinking due to the fact that the acrylic copolymers and the crosslinked polymers comprising the acrylic copolymers are restrained from moving by the multimeric complex produced by a reaction of the isocyanate compound (C) with water in the environment and chemical crosslinking between the multimeric complex and the crosslinked polymers comprising the acrylic copolymers.

Furthermore, the inventors have considered that reactivity between the acrylic copolymer (B) and the isocyanate compound (C) is high, thereby first of all, chemical crosslinking between the acrylic copolymers (B) with each other selectively progresses, and then, the reaction of the isocyanate compound (C) with water in the environment, chemical crosslinking between the acrylic copolymer (A) and the acrylic copolymer (B), and chemical crosslinking between the acrylic copolymers (A) with each other subsequently progress. The crosslinking construction of the acrylic copolymers (B) with each other has high cohesion force based on the properties of the acrylic copolymer (B), and the crosslinking construction of the acrylic copolymers (A) with each other has high flexibility based on the properties of the acrylic copolymer (A). The inventors have found out that the multimeric complex produced by the reaction of the isocyanate compound (C) with water in the environment is hard, so that not only it restrains the acrylic copolymers and the crosslinked polymers comprising the acrylic copolymers from moving, but also it can heighten the cohesion force due to the fact that the hard multimeric complex exists in the intertwined structure between the crosslinked polymers comprising the acrylic copolymers.

Based on the above-mentioned findings, the inventors have found out a pressure-sensitive adhesive composition and pressure-sensitive adhesive having a structure (namely, a pseudo IPN structure) that a part having high cohesion force due to chemical crosslinking between the acrylic copolymers (B) with each other, a part of the hard multimeric complex produced by the reaction of the isocyanate compound (C) with water, and a part having high flexibility due to chemical crosslinking between the acrylic copolymers (A) with each other are inhomogeneously dispersed, and that, furthermore, the whole composition is intertwined by the chemical crosslinking between the acrylic copolymer (A) and the acrylic copolymer (B), and the physical crosslinking and the chemical crosslinking formed by the multimeric complex produced by a reaction of the isocyanate compound (C) with water. The inventors have found out that a pressure-sensitive adhesive composition and a pressure-sensitive adhesive having the above-mentioned pseudo IPN structure has high cohesion force and excellent in flexibility and can realize both of enhancement of durability and inhibition of bright defect at a high level.

Hereinafter, the present invention will be explained in detail by Embodiments.

Embodiments

A pressure-sensitive adhesive composition according to an embodiment of the present invention comprises an acrylic copolymer (A), an acrylic copolymer (B) and an isocyanate compound (C). The pressure-sensitive adhesive composition according to the embodiment comprises crosslinked polymers having a structure that the acrylic copolymers (A) as a relaxation ingredient are crosslinked with each other due to the isocyanate compound (C), a structure that the acrylic copolymers (A) and the acrylic copolymer (B) as an elasticity ingredient are crosslinked with each other due to the isocyanate compound (C), and a structure that the acrylic copolymers (B) are crosslinked with each other due to the isocyanate compound (C). Furthermore, the pressure-sensitive adhesive composition according to the embodiment has physical crosslinking that the multimeric complex produced by a reaction of the isocyanate compound (C) with water in the environment, the isocyanate compound (C) not contributing to the crosslinking reaction with the acrylic copolymer (A) and the acrylic copolymer (B), restrains the crosslinked polymers from moving, and chemical crosslinking between the multimeric complex and the crosslinked polymers. Namely, the pressure-sensitive adhesive composition according to the embodiment comprises a multimeric complex produced by that the reactive functional groups of the acrylic copolymer (A) and the acrylic copolymer (B) react with the isocyanate compound (C) so as to be crosslinked, and simultaneously isocyanate groups of the isocyanate compound (C) not contributing to the crosslinking reaction react with water in the environment.

In the embodiment, the acrylic copolymer (A) is a copolymer that mainly contains therein an acrylic acid ester monomer and a methacrylic acid ester monomer as a component of the copolymer, and is obtained by copolymerizing monomers containing (meth)acrylic acid ester and a reactive functional group. Further, hereinafter, in case of describing a word including "acry" together with a word including "methacry", it may be described as "(meth)acry". The acrylic copolymer (A) means a copolymer including (meth)acrylic acid ester in an amount of not less than 80% by weight, and is preferably a copolymer including (meth)acrylic acid ester in an amount of not less than 90% by weight.

In addition, the acrylic copolymer (B) is a copolymer that mainly contains therein (meth)acrylic acid ester monomer as components of the copolymer, is obtained by copolymerizing a (meth)acrylic acid ester containing monomer and a reactive functional group containing monomer, and is different from the acrylic copolymer (A). The pressure-sensitive adhesive composition according to the embodiment uses a mixture of the acrylic copolymer (A) and the acrylic copolymer (B) as components of copolymer, thereby cohesion force and stress relaxation properties can be adjusted in a balanced manner.

The (meth)acrylic acid ester monomer is not particularly limited, if it has a (meth)acrylic acid ester structure, and for example, it is possible to use straight or branched alkyl ester of acrylic acid having carbon number of 1 to 18, and further one or not less than two of various types of derivatives thereof, particularly, such as methyl(meth)acrylate, ethyl(meth)acrylate, n-butyl(meth)acrylate, i-butyl(meth)acrylate, t-butyl(meth)acrylate, n-octyl(meth)acrylate, i-octyl(meth)acrylate, 2-ethylhexyl(meth)acrylate, n-nonyl(meth)acrylate, i-nonyl(meth)acrylate, n-decyl(meth)acrylate, n-dodecyl(meth)acrylate, stearyl(meth)acrylate.

A constituent component in the acrylic copolymer (A) includes a reactive functional group containing monomer in order to react the acrylic copolymer (A) with the isocyanate compound (C). Further, a (meth)acrylic acid ester containing monomer that further contains a reactive functional group is also counted as an amount of the (meth)acrylic acid ester containing monomer contained in the acrylic copolymer (A) as components of the copolymer when the acrylic copolymer is defined.

As the reactive functional group containing monomer, for example, it is possible to use one or not less than two of a carboxyl group containing monomer, a hydroxyl group containing monomer, a glycidyl group containing monomer, an amide group containing monomer, an N-substituted amide group containing monomer, and a tertiary amide group containing monomer.

As the carboxyl group containing monomer, for example, it is possible to use acrylic acid, methacrylic acid, maleic acid, maleic acid anhydride, fumaric acid, crotonic acid, itaconic acid, citraconic acid, cinnamic acid, succinic acid monohydroxyethyl(meth)acrylate, maleic acid monohydroxyethyl (meth)acrylate, fumaric acid monohydroxyethyl(meth)acrylate, 1,2-dicarboxycyclohexane monohydroxyethyl(meth) acrylate, (meth)acrylic acid dimer, and ω-carboxypolycaprolactone(meth)acrylate.

As the hydroxyl group containing monomer, for example, it is possible to use 2-hydroxyethyl(meth)acrylate, 2-hydroxypropyl(meth)acrylate, 3-hydroxypropyl(meth)acrylate, 4-hydroxybutyl(meth)acrylate, 3-methyl-3-hydroxybutyl(meth)acrylate, 1,1-dimethyl-3-butyl(meth)acrylate, 1,3-dimethyl-3-hydroxybutyl(meth)acrylate, 2,2,4-trimethyl-3-hydroxypentyl(meth)acrylate, 2-ethyl-3-hydroxyhexyl(meth)acrylate, glycerinmono(meth)acrylate, polypropyleneglycolmono(meth)acrylate, polyethyleneglycol mono(meth)acrylate, poly(ethyleneglycol-propyleneglycol)mono(meth)acrylate, N-methylolacrylamide, allyl alcohol and methallyl alcohol.

As the glycidyl group containing monomer, for example, it is possible to use glycidyl(meth)acrylate, 3,4-epoxycyclohexylmethyl(meth)acrylate, glycidyl vinyl ether, 3,4-epoxycyclohexylmethyl vinyl ether, glycidyl(meth)allyl ether, 3,4-epoxycyclohexylmethyl(meth)allyl ether.

As the amide group containing monomer and N-substituted amide group containing monomer, for example, it is possible to use acrylamide, methacrylamide, N-methyl(meth)acrylamide, N-ethyl(meth)acrylamide, N-methoxymethyl(meth)acrylamide, N-ethoxymethyl(meth)acrylamide, N-propoxymethyl(meth)acrylamide, N-butoxymethyl(meth)acrylamide, N-tert-butyl acrylamide, N-octyl acrylamide, diacetone acrylamide.

As the tertiary amide group containing monomer, it is possible to use dimethylaminoethyl(meth)acrylate, diethylaminoethyl(meth)acrylate, dimethylaminopropyl(meth)acrylamide.

In the embodiment, it is preferable that a carboxyl group containing monomer of monomers containing various types of functional groups as a component of the copolymer is contained in the acrylic copolymer (A) as a component of the copolymer. In addition, the carboxyl group containing monomer and a hydroxyl group containing monomer can be contained in the acrylic copolymer (A) as a component of the copolymer.

The content ratio of the carboxyl group containing monomer as a component of the copolymer is controlled to not less than 0.5% by weight, and preferably not less than 1% by weight to the acrylic copolymer (A), for the purpose of increasing cohesion force of the pressure-sensitive adhesive composition so as to enhance durability of the pressure-sensitive adhesive composition. In addition, the content ratio of the carboxyl group containing monomer as a component of the copolymer is controlled to not more than 5% by weight, preferably not more than 3% by weight and more preferably not more than 2% by weight to the acrylic copolymer (A), for the purpose of preventing adhesion force of the pressure-sensitive adhesive composition from becoming too high.

The content ratio of the hydroxyl group containing monomer as a component of the copolymer is controlled to not less than 0.001% by weight, and preferably not less than 0.01% by weight to the acrylic copolymer (A), for the purpose of inhibiting bright defect. In addition, the content ratio of the hydroxyl group containing monomer as a component of the copolymer is controlled to not more than 1% by weight, and preferably not more than 0.5% by weight to the acrylic copolymer (A), for the purpose of preventing separation from being caused at durability test.

It is possible for the acrylic copolymer (A) to contain monomers other than the (meth)acrylic acid ester monomer as a component of the copolymer in the range not exceeding the definition of the acrylic copolymer (A). As the monomer other than the (meth)acrylic acid ester monomer, as an example, it is possible to use saturated fatty acid vinyl ester, aromatic vinyl ester, vinyl cyanide monomer, diester of maleic acid or fumaric acid. As the saturated fatty acid vinyl ester, for example, it is possible to use vinyl formate, vinyl acetate, vinyl propionate, "vinyl versatate" (trade name), preferably vinyl acetate; as aromatic vinyl ester, for example, it is possible to use styrene, a-methylstyrene, vinyl toluene; as the vinyl cyanide monomer, for example, it is possible to use acrylonitrile, methacrylonitrile; and as diester of maleic acid or fumaric acid, for example, it is possible to use dimethyl malate, di-N-butyl malate, di-2-ethylhexyl malate, di-N-octyl malate, dimethyl fumarate, di-N-butyl fumarate, di-2-ethylhexyl fumarate, di-N-octyl fumarate.

In addition, as a constituent component of the acrylic copolymer (B), it is possible to use the same component of the copolymer as the component exemplified as (meth)acrylic acid ester, monomers having reactive functional group and other monomers in the acrylic copolymer (A). It is preferable that a carboxyl group containing monomer and a hydroxyl group containing monomer of monomers containing various types of functional groups as a component of the copolymer is contained in the acrylic copolymer (B) as a component of the copolymer. If the acrylic copolymer (B) contains the carboxyl group containing monomer and the hydroxyl group containing monomer, the acrylic copolymer (B) having high cohesion force and simultaneously capable of easily adjusting cohesion force and stress relaxation properties can be realized.

The content ratio of the carboxyl group containing monomer as a component of the copolymer of the acrylic copolymer (B) is controlled to not less than 0.1% by weight, preferably not less than 0.3% by weight and more preferably not less than 0.5% by weight to the acrylic copolymer (B), for the purpose of increasing cohesion force of the pressure-sensitive adhesive composition so as to enhance durability of the pressure-sensitive adhesive composition. In addition, the content ratio of the carboxyl group containing monomer as a component of the copolymer of the acrylic copolymer (B) is controlled to not more than 5% by weight, preferably not more than 3% by weight and more preferably not more than 2% by weight to the acrylic copolymer (B), for the purpose of preventing adhesion force of the pressure-sensitive adhesive composition from becoming too high.

The content ratio of the hydroxyl group containing monomer as a component of the copolymer of the acrylic copolymer (B) is controlled to not less than 0.01% by weight, preferably not less than 0.1% by weight and more preferably not less than 0.3% by weight to the acrylic copolymer (B), for the purpose of inhibiting bright defect. In addition, the content ratio of the carboxyl group containing monomer as a component of the copolymer of the acrylic copolymer (B) is controlled to not more than 5% by weight, preferably not more than 3% by weight and more preferably not more than 1% by weight to the acrylic copolymer (B), for the purpose of preventing separation from being caused at durability test.

The weight-average molecular weight (Mw) of the acrylic copolymer (A) is controlled to not less than 900,000, preferably not less than 1,100,000, and more preferably not less than 1,400,000, for the purpose of providing sufficient cohesion force for the pressure-sensitive adhesive composition and inhibiting air bubbles from being produced. In addition, the weight-average molecular weight (Mw) of the acrylic copolymer (B) is controlled to not less than 900,000, preferably not less than 1,100,000, and more preferably not less than 1,400,000, for the purpose of providing sufficient cohesion force for the pressure-sensitive adhesive composition. Furthermore, the weight-average molecular weight (Mw) of the acrylic copolymer (A) and the acrylic copolymer (B) is controlled to not more than 2,500,000, for the purpose of ensuring coating workability of the pressure-sensitive adhesive composition.

The weight-average molecular weight (Mw) of the acrylic copolymer (A) and the acrylic copolymer (B) is a value measured by the method described below.

(Measuring Method of Weight-Average Molecular Weight (Mw))

The weight-average molecular weight (Mw) is measured in accordance with the following steps (1) to (3).
(1) Coating a paper liner with an acrylic copolymer solution, and drying at 100 degrees C. for 2 minutes so as to obtain an acrylic copolymer having a film-like shape.
(2) Dissolving the acrylic copolymer having a film-like shape with tetrahydrofuran so as to obtain solid content concentration of 0.2%.
(3) Measuring the weight-average molecular weight (Mw) of the acrylic copolymer by using gel permeation chromatography (GPC) under the conditions described below.
(Conditions)
GPC: HLC-8220 GPC (manufactured by Tosoh Corporation)
Column: TSK-GEL GMHXL Use of Four columns
Mobile phase solvent: tetrahydrofuran
Flow speed: 0.6 ml/min Column temperature: 40 degrees C.

The glass-transition temperature ($Tg_A$) of the acrylic copolymer (A) is controlled to not less than −80 degrees C., and preferably not less than −60 degrees C., for the purpose of providing sufficient cohesion force for the pressure-sensitive adhesive composition and making the composition bring out sufficient durability. In addition, the glass-transition temperature ($Tg_A$) of the acrylic copolymer (A) is controlled to not more than −20 degrees C., and preferably not more than −40 degrees C., for the purpose of making the pressure-sensitive adhesive composition bring out sufficient adhesion to the supporting substrate so as to make the composition bring out durability that separation or the like is not caused.

On the other hand, it is preferable that the glass-transition temperature ($Tg_B$) of the acrylic copolymer (B) is higher than the glass-transition temperature ($Tg_A$) of the acrylic copolymer (A), namely a relationship represented by a formula of ($Tg_A$)<($Tg_B$) is satisfied. If the above mentioned relationship between the glass-transition temperature ($Tg_A$) of the acrylic copolymer (A) and the the glass-transition temperature ($Tg_B$) of the acrylic copolymer (B) is satisfied, the acrylic copolymer (B) has cohesion force higher than the acrylic copolymer (A), so that balance between cohesion force and stress relaxation properties of the components of the copolymer can be easily adjusted. In particular, the glass-transition temperature ($Tg_B$) of the acrylic copolymer (B) is controlled to not less than −60 degrees C., and preferably not less than −50 degrees C., for the purpose of providing sufficient cohesion force for the pressure-sensitive adhesive composition and making the composition bring out sufficient durability. In addition, the glass-transition temperature ($Tg_B$) of the acrylic copolymer (B) is controlled to not more than 0 degrees C., and preferably not more than −30 degrees C., for the purpose of making the pressure-sensitive adhesive composition bring out sufficient adhesion to the supporting substrate so as to make the composition bring out durability that separation or the like is not caused.

The glass-transition temperature (Tg) of the acrylic copolymer (A) and the acrylic copolymer (B) is a value obtained by converting a temperature (degrees K.) calculated by the Formula 1 described below to a temperature (degrees C.).

$$1/Tg = M1/Tg_1 + M2/Tg_2 + M3/Tg_3 + \ldots Mn/Tg_n \quad \text{[Formula 1]}$$

In the Formula 1, $Tg_1$, $Tg_2$, $Tg_3$ ... and $Tg_n$ represent the glass-transition temperature (K) of homopolymer of the component 1, component 2, component 3, ... and component n respectively. Also, in the Formula 1, M1, M2, M3, ... and Mn represent the molar fraction of the components respectively.

In addition, it is preferred to use plastics that are soft and extremely tenacious as the acrylic copolymer (A) being a relaxation ingredient. In particular, as the acrylic copolymer (A), the acrylic copolymer (A) is used, that has the elongation of not less than 600%, preferably not less than 700%, at break as determined at 25 degrees C. by the tensile test of the crosslinking film, if the isocyanate compound (C) is added in an amount of 1 equivalent of an isocyanate group per equivalent of the reactive functional group of the acrylic copolymer (A), and a crosslinking film is formed by being cured for 10 days under the environment of 23 degrees C. and 50% relative humidity (RH). In addition, the elongation of the acrylic copolymer (A) is preferably not more than 3,000%, more preferably not more than 2,000%. If the elongation is not less than the lower limit, the acrylic copolymer (A) has good durability in the sense that it has good flexibility and following-up properties, and separation is not caused, and if the elongation is not more than the upper limit, the acrylic copolymer (A) has good durability in the sense that it has sufficient cohesion force and simultaneously occurrence of air bubbles and separation are not caused.

On the other hand, it is preferred to use plastics that are hard and somewhat brittle as the acrylic copolymer (B) that is an elasticity ingredient. In particular, as the acrylic copolymer (B), the acrylic copolymer (B) is used, that has the elongation of less than 600%, preferably not less than 200% and less than 600%, more preferably not less than 200% and not more than 500% at break as determined at 25 degrees C. by the tensile test of the crosslinking film, if the isocyanate compound (C) is added in an amount of 1 equivalent of an isocyanate group per equivalent of the reactive functional group of the acrylic copolymer (B), and a crosslinking film is formed by being cured for 10 days under the environment of 23 degrees C. and 50% relative humidity (RH). If the elongation is not less than the lower limit, the acrylic copolymer (B) has good durability in the sense that it has appropriate cohesion force and simultaneously separation are not caused, and if the elongation is not more than the upper limit, the acrylic copolymer (B) has a good durability in the sense that it has sufficient cohesion force and simultaneously separation are not caused.

The elongation at break in the tensile test of the acrylic copolymer (A) and the acrylic copolymer (B) can be measured as described below. Namely, the elongation at break in the tensile test of the crosslinking film can be measured in accordance with the following steps (1) to (5).

(1) Adding the isocyanate compound (C) to an acrylic copolymer solution in an amount of 1 equivalent of an isocyanate group per equivalent of the reactive functional group of the acrylic copolymer so as to prepare a coating solution.
(2) Coating a release sheet of which surface is treated by a silicone based releasing agent with the coating solution prepared in the step (1) in such a way that the coating thickness after drying becomes 25 μm, and then drying by a hot air circulation type drying machine at 100 degrees C. for 90 seconds, so as to form a membrane having a film-like shape.
(3) Curing the membrane formed for 10 days under the environment of 23 degrees C. and 50% relative humidity (RH) so as to form a crosslinking film.
(4) Cutting out the crosslinking film obtained in the step (3) to be 150 mm×30 mm, and forming a cylinder having a width of 30 mm so as to fabricate test samples.
(5) Carrying out the tensile test of the test samples under the environment of 23 degrees C. and under the conditions of distance between chucks of 10 mm and tension speed of 100 mm/min, and obtaining a stress-strain curve.
(6) Defining a strain amount at break of the test samples as the elongation at break.

The polymerization method of the acrylic copolymer (A) and the acrylic copolymer (B) used for the embodiment is not particularly limited, but the acrylic copolymers (A) and (B) can be polymerized by a method such as solution polymerization, emulsion polymerization, and suspension polymerization. Further, when the pressure-sensitive adhesive composition according to the embodiment is manufactured by using a mixture of the copolymer obtained by polymerization, it is preferable that the polymerization is carried out by solution polymerization, since the processing steps are relatively easy and carried out in a short time.

Generally, as the solution polymerization, it is possible to use a method, for example, that comprises storing predetermined organic solvents, monomers, polymerization initiators, and chain transfer agents used if necessary in a polymerization tank, and conducting a heating reaction in a stream of nitrogen gas or at a reflux temperature of the organic solvent for several hours while stirring. Further, it is possible to obtain the acrylic copolymer (A) and the acrylic copolymer (B) having the weight-average molecular weight of a desired molecular weight respectively by adjusting reaction temperature, reaction time, the amount of solvent, and the sort and amount of catalyst.

The pressure-sensitive adhesive composition according to the embodiment comprises the isocyanate compound (C) added in an amount of 5 to 30 parts by weight per 100 parts by weight of a mixture of the acrylic copolymer (A) and the acrylic copolymer (B).

As the isocyanate compound (C), for example, it is possible to use an aromatic isocyanate such as xylylene diisocyanate, diphenylmethane diisocyanate, triphenylmethane triisocyanate, tolylene diisocyanate; an aliphatic or alicyclic isocyanate such as hexamethylene diisocyanate, isophorone diisocyanate, a hydrogenation product of the above-mentioned aromatic isocyanate compound; and an isocyanate compound derived from various types of isocyanates such as an adduct of dimeric or trimeric isocyanate of the above-mentioned isocyanates or the above-mentioned isocyanates themselves, and polyol such as trimethylol propane. The above-mentioned isocyanate compounds can be used individually or in combination with each other.

As the isocyanate compound (C), for example, it is possible to appropriately use commercially available products sold under the trade names such as "Coronate L", "Coronate HX", "Coronate HL-S", and "Coronate 2234" manufactured by Nippon Polyurethane Industry Co., Ltd.; "Desmodur N 3400" manufactured by Sumitomo Bayer Urethane Co., Ltd.; "Duranate E-405-80T" and "Duranate TSE-100" manufactured by Asahi Kasei Corporation; and "Takenate D-110N", "Takenate D-120N", and "Takenate M-631N" manufactured by Mitsui Takeda Chemicals Inc.

Above all, as the isocyanate compound (C), an isocyanate derived from an aromatic isocyanate is preferable in terms of durability and bright defect, and an isocyanate derived from tolylene diisocyanate is more preferable.

A used amount of the isocyanate compound (C) is controlled to not less than 5 parts by weight, preferably not less than 10 parts by weight per 100 parts by weight of a mixture of the acrylic copolymer (A) and the acrylic copolymer (B), for the purpose of inhibiting bright defect. In addition, a used amount of the isocyanate compound (C) is controlled to not more than 30 parts by weight, preferably not more than 20 parts by weight per 100 parts by weight of a mixture of the acrylic copolymer (A) and the acrylic copolymer (B), for the purpose of ensuring compatibility between the acrylic copolymer (A) and the isocyanate compound (C) and providing a tacky feeling sufficiently.

In addition, it is considered that in the pressure-sensitive adhesive composition according to the embodiment, the isocyanate group of the isocyanate compound (C) not contributing to the crosslinking with the copolymer forms a multimeric complex by reacting with water in the environment. It is considered that the reactivity between the isocyanate group and water is relatively high, thus even though the isocyanate group is not provided in an amount excessive to the reactive functional group of the plastics, a part of the isocyanate groups form the multimeric complex by reacting with water in the environment, but for the purpose of forming a lot of multimeric complex in order to inhibit bright defect and enhance durability, the isocyanate group is used in an amount of more than 1 equivalent, preferably not less than 1.01 equivalent, furthermore preferably not less than 1.2 equivalent, per equivalent of the total reactive functional groups of the acrylic copolymer (A) and the acrylic copolymer (B).

In the pressure-sensitive adhesive composition according to the embodiment, a crosslinking agent other than the isocyanate compound (C) can be used concurrently. The crosslinking agent other than the isocyanate compound (C) is not particularly limited, if it reacts with the acrylic copolymer (A) and/or the acrylic copolymer (B) so as to form a crosslinking structure, includes an aziridine compound, an epoxy compound, a melamine-formaldehyde condensate, a metallic salt, and a metallic chelate compound. The crosslinking agent other than the isocyanate compound (C) can be used individually or in combination of at least two thereof. In the embodiment, it is preferable that the aziridine compound and/or the epoxy compound are/is used as the crosslinking agent other than the isocyanate compound (C).

As the aziridine compound, it is possible to use a reaction product of the isocyanate compound and ethyleneimine, and as the isocyanate compound, it is possible to use the above-exemplified compounds. Also, a compound obtained by adding ethyleneimine to a polyvalent ester of polyol such as trimethylol propane or pentaerythritol and (meth)acrylic acid or the like is known and can be used.

The aziridine compound includes, for example, N,N'-hexamethylenebis(1-aziridine carboamide), methylenebis[N-(aziridinylcarbonyl))-4-aniline], tetramethylolmethane-tris(β-aziridinylpropionate), trimethylolpropane-tris(β-aziridinylpropionate), above all, it is possible to appropriately use commercially available products sold under the trade names such as "TAZO", and "TAZM" manufactured by Sogo Pharmaceutical Co., Ltd.; and "CHEMITITE PZ-33" manufactured by Nippon Shokubai Co., Ltd.

As the epoxy compound, for example, it is possible to use ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether, polyglycerol polyglycidyl ether, resorcin diglycidyl ether, 2,2-dibromoneopentyl glycol diglycidyl ether, trimethylolpropane triglycidyl ether, pentaerythritol polyglycidyl ether, sorbitol polyglycidyl ether, adipic acid diglycidyl ether, phthalic acid diglycidyl ether, tris(glycidyl)isocyanurate, tris(glycydoxyethyl)isocyanurate, 1,3-bis(N,N-glycidylaminomethyl)cyclohexane, N,N,N',N'-tetraglycidyl-m-xylylenediamine.

Of the epoxy compound, it is preferred to use an epoxy compound having at least three epoxy groups, above all it is more preferred to use an epoxy compound such as tris(glycidyl)isocyanurate, tris(glycydoxyethyl)isocyanurate, 1,3-bis(N,N-glycidylaminomethyl)cyclohexane, and N,N,N',N'-tetraglycidyl-m-xylylenediamine, and it is furthermore preferred to use an epoxy compound such as 1,3-bis(N,N-glycidylaminomethyl)cyclohexane, and N,N,N',N'-tetraglycidyl-m-xylylenediamine. As the epoxy compound like this, for example, it is possible to appropriately use commercially available products sold under the trade names such as "TETRAD-C", and "TETRAD-X" manufactured by Mitsubishi Gas Chemical Company Inc.

In the pressure-sensitive adhesive composition according to the embodiment, a silane compound can be further used. As the silane compound, it is possible to use an organic substituent group containing silicone alkoxyoligomer such as mercapto group containing silicone alkoxyoligomer, epoxy group containing silicone alkoxyoligomer, amino group containing silicone alkoxyoligomer, phenyl group containing silicone alkoxyoligomer, and methyl group containing silicone alkoxyoligomer; a mercapto group containing silane compound such as γ-mercaptopropyltrimethoxysilane, γ-mercaptopropyltriethoxysilane, and γ-mercaptopropyldimethoxymethylsilane; an alicyclic epoxy group containing silane compound such as β-(3,4-epoxycyclohexyl)ethyltrimethoxysilane, and β-(3,4-epoxycyclohexyl)ethyltriethoxysilane; an epoxy group containing silane compound such as methyltri(glycidyl)silane, γ-glycydoxypropylmethyldimethoxysilane, γ-glycydoxypropyltrimethoxysilane, and γ-glycydoxypropyltriethoxysilane; a carboxyl group containing silane compound such as 3-triethoxysilyl propyl succinic acid (anhydride), 3-trimethoxysilyl propyl succinic acid (anhydride), 3-methyldimethoxysilyl propyl succinic acid (anhydride), methyldiethoxysilyl propyl succinic acid (anhydride), and 1-carboxy-3-triethoxysilyl propyl succinic acid (anhydride); an amino group containing silane compound such as N-(β-aminoethyl)-γ-aminopropylmethyldimethoxysilane, N-(β-aminoethyl)-γ-aminopropyltrimethoxysilane, N-(⊖-aminoethyl)-γ-aminopropyltriethoxysilane, γ-aminopropyltrimethoxysilane, γ-aminopropyltriethoxysilane, and N-phenyl-γ-aminopropyltrimethoxysilane; a hydroxyl group containing silane compound such as γ-hydroxpropyltrimethoxysilane; and amide group containing silane based compound such as γ-amidopropyltrimethoxysilane; an isocyanate group containing silane compound such as γ-isocyanatepropyltrimethoxysilane; and an isocyanurate skeleton containing silane compound such as tris(3-trimethoxysilylpropyl)isocyanurate, and tris(3-triethoxysilylpropyl)isocyanurate. In terms of enhancing durability, it is preferable that the silane compound is used.

In addition, a used amount of the silane compound is controlled to not less than 0.01 and not more than 3 parts by weight, preferably not less than 0.01 and not more than 2 parts by weight and furthermore preferably not less than 0.02 and not more than 1 parts by weight per 100 parts by weight of a mixture of the acrylic copolymer (A) and the acrylic copolymer (B), for the purpose of enhancing durability of the pressure-sensitive adhesive composition. Furthermore, in the pressure-sensitive adhesive composition according to the embodiment, various types of additive materials other than the acrylic copolymer (A), the acrylic copolymer (B), the isocyanate compound (C), the crosslinking agent other than the isocyanate compound and the silane compound can be appropriately blended in an amount within a range that does not damage advantages provided by the pressure-sensitive adhesive composition according to the embodiment. As the various types of additive materials, it is possible to use various types of additive agents, solvents, weather resistant stabilizers, tackifiers, plasticizers, softeners, dyes, pigments, and inorganic fillers.

The range of blending amount of the weather resistant stabilizer, tackifier, plasticizer, softener, dye, pigment, inorganic filler or the like is preferably not more than 30 parts by weight, more preferably not more than 20 parts by weight, furthermore preferably not more than 10 parts by weight, per 100 parts by weight of a mixture of the acrylic copolymer (A) and the acrylic copolymer (B). The blending amount is defined within the above-mentioned range, thereby a balance among adhesion force, wettability, heat resistance, and adhesive transfer property of the pressure-sensitive adhesive composition can be appropriately maintained and a pressure-sensitive adhesive composition having good various types of properties can be obtained.

In the pressure-sensitive adhesive composition according to the embodiment, it is considered that the reactive functional groups of the acrylic copolymer (A) and the acrylic copolymer (B), and the isocyanate compound (C) form a crosslinking structure, and an isocyanate compound not contributing to the crosslinking reaction reacts with water in the environment so as to form a multimeric complex. The gel fraction after the crosslinking structure and the multimeric complex are formed is not less than 60% by weight, preferably not less than 70% by weight, % by weight, more preferably not less than 75% by weight, further more preferably not less than 80% by weight, for the purpose of preventing occurrence of air bubbles at a durability evaluation. In addition, the gel fraction after the crosslinking structure and the multimeric complex are formed is not more than 95% by weight, for the purpose of preventing separation from being caused.

The gel fraction can be measured by the method described below.

(Measurement of Gel Fraction of Pressure-Sensitive Adhesive Composition)

The gel fraction is measured in accordance with the steps (1) to (6).

(1) Coating a separation sheet of which surface is treated by a silicone based release agent with a solution of the pressure-sensitive adhesive composition in such a way that a coating amount becomes 25 g/m² after drying, and drying by a hot air circulation type drying machine at 100 degrees C. for 90 seconds, so as to form a pressure-sensitive adhesive layer having a film-like shape.

(2) Curing the pressure-sensitive adhesive layer formed for 10 days under the environment of 23 degrees C. and 50% relative humidity (RH).

(3) Adhering approximate 0.25 g of the pressure-sensitive adhesive layer having a film-like shape obtained in the step (2) to a of 250 mesh (100 mm×100 mm) accurately weighted, and wrapping it so as not to leak the gel fraction. After that, the weight is accurately measured by a precision balance so as to fabricate samples.

(4) Immersing the above-mentioned metallic net in an ethyl acetate solution for 3 days.

(5) After immersion, taking out the metallic net and cleaning by a little amount of ethyl acetate and drying at 120 degrees C. for 24 hours. After that, the weight is accurately measured by a precision balance.

(6) Calculating the gel fraction by the following formula.

$$\text{Gel fraction(\% by weight)} = (C-A)/(B-A) \times 100$$

In the formula, A represents the weight of the metallic net (g), B represents the weight of the metallic net (the weight of pressure-sensitive adhesive) (g) to which the pressure-sensitive adhesive is adhered, and C represents the weight of the metallic net dried after immersion (the weight of gel resin) (g).

The difference between the solubility parameter ($SP_A$) of acrylic copolymer (A) and the solubility parameter ($SP_B$) of acrylic copolymer (B) (namely, $\Delta SP = SP_A - SP_B$) is preferably −0.5 to 0.5, more preferably −0.4 to 0.4, and furthermore preferably −0.2 to 0.2. If the difference between the solubility parameters ($\Delta SP$) is included in the above-mentioned range, it is preferable, since the compatibility between the acrylic copolymer (A) and the acrylic copolymer (B) becomes extremely excellent.

The solubility parameter is calculated by a method of Fedor. The method of Fedor is described in, for example, "SP value Base-Application and Calculation Method" (Author: Hideki Yamamoto, Publisher: Johokiko Co., Ltd., 2005). In the method of Fedor, the solubility parameter is calculated by the following Formula 2.

$$\text{Solubility parameter} = [\Sigma Ecoh/\Sigma V]^{0.5} \qquad \text{[Formula 2]}$$

In the Formula 2, Ecoh represents a cohesion energy density, and V represents a mole molecular volume. The solubility parameter can be calculated by obtaining the sum of Ecoh and V, namely $\Sigma$ Ecoh and $\Sigma$ V, in the repeating unit of polymers based on Ecoh and V decided for each atom group. The solubility parameter of the copolymer can be calculated by calculating the solubility parameter of each homocopolymer of each constituent unit constituting the copolymer in accordance with the above-mentioned Formula 2, and totalizing values obtained by multiplying each of the SP values by the mole fraction of each constituent unit.

The mixing ratio of the acrylic copolymer (A) and the acrylic copolymer (B) is controlled to not less than 50/50, preferably not less than 70/30, more preferably not less than 80/20, in a ratio by weight (weight of the acrylic copolymer (A)/weight of the acrylic copolymer (B)), for the purpose of inhibiting separation from being caused at durability test. In addition, the mixing ratio of the acrylic copolymer (A) and the acrylic copolymer (B) is controlled to not more than 99/1, preferably not more than 95/5, more preferably not more than 90/10, in a ratio by weight (weight of the acrylic copolymer (A)/weight of the acrylic copolymer (B)), for the purpose of inhibiting occurrence of air bubbles at durability test.

The pressure-sensitive adhesive layer formed from the pressure-sensitive adhesive composition according to the embodiment has the elongation at break and 200% modulus as determined at 25 degrees C. by the tensile test that are 300 to 1000%, preferably 500 to 800%, and 0.2 to 3 N/mm², preferably 0.4 to 2 N/mm² respectively. If the elongation is not less than the lower limit, the pressure-sensitive adhesive has good durability in the sense that it has good flexibility and following-up properties, and separation is not caused, and if the elongation is not more than the upper limit, the pressure-sensitive adhesive has good durability in the sense that it has sufficient cohesion force and simultaneously occurrence of air bubbles and separation are not caused. Furthermore, if the 200% modulus is not less than the lower limit, the pressure-sensitive adhesive is excellent in inhibiting bright defect, and if the 200% modulus is not more than the upper limit, the pressure-sensitive adhesive has excellent durability in the sense that it has appropriate cohesion force and simultaneously separation are not caused.

(Measuring Method of Elongation at Break and 200% Modulus in Tensile Test)

Further, the measuring method of elongation at break and 200% modulus in the tensile test of pressure-sensitive adhesive is as follows.

Namely, the elongation and 200% modulus at the judgment are measured in accordance with the following steps (1) to (5).

(1) Coating a separation sheet of which surface is treated by a silicone based release agent with a solution of the pressure-sensitive adhesive composition in such a way that a coating thickness after drying becomes 25 μm, and then drying by a hot air circulation type drying machine at 100 degrees C. for 90 seconds, so as to form a pressure-sensitive adhesive layer having a film-like shape.

(2) Curing the pressure-sensitive adhesive layer formed for 10 days under the environment of 23 degrees C. and 50% relative humidity (RH).

(3) Cutting out the pressure-sensitive adhesive layer having a film-like shape obtained in the step (2) to be 150 mm×30 mm, and forming a cylinder having a width of 30 mm so as to fabricate test samples.

(4) Carrying out the tensile test of the test samples under the environment of 23 degrees C. and under the conditions of distance between chucks of 10 mm and tension speed of 100 mm/min, and obtaining a stress-strain curve.

(5) Defining a strain amount at break of the test samples as the elongation at break, and simultaneously obtaining a value calculated by dividing the stress when the elongation is 200% by the initial cross-section area (namely, 3.75 mm$^2$) as the 200% modulus.

The pressure-sensitive adhesive composition according to the embodiment is manufactured by passing through at least the step of mixing the acrylic copolymer (A) and the acrylic copolymer (B) that have a reactive functional group respectively, and the isocyanate compound (C) that conducts a crosslinking reaction with the reactive functional group. And, in the mixing step, the isocyanate compound (C) is mixed into the mixture of the acrylic copolymer (A) and the acrylic copolymer (B) in such an amount that the equivalent of the isocyanate group of the isocyanate compound (C) becomes larger than the total equivalent of the reactive functional groups of the acrylic copolymer (A) and the acrylic copolymer (B). In particular, the pressure-sensitive adhesive composition according to the embodiment is manufactured by passing through the steps of preparing the acrylic copolymer (A) and the acrylic copolymer (B) that have a reactive functional group, preparing the isocyanate compound (C) that conducts a crosslinking reaction with the reactive functional group, and mixing the acrylic copolymer (A) and the acrylic copolymer (B) prepared and the isocyanate compound (C) prepared. Also, in the step of preparing the isocyanate compound (C), the isocyanate compound (C) is prepared in such an amount that the equivalent of the isocyanate group of the isocyanate compound (C) becomes larger than the total equivalent of the reactive functional groups of the acrylic copolymer (A) and the acrylic copolymer (B).

(Optical Film)

FIG. 1 is a sectional view schematically showing an optical film according to the embodiment, and FIG. 2 is a sectional view schematically showing an optical film according to modification of the embodiment.

The optical film according to the embodiment is an optical film that has a pressure-sensitive adhesive layer formed from the pressure-sensitive adhesive composition according to the embodiment. The particular manufacturing method comprises coating a release sheet with the pressure-sensitive adhesive composition according to the embodiment and drying so as to form the pressure-sensitive adhesive layer on the release sheet. In addition, the optical film is manufactured by transferring the pressure-sensitive adhesive layer formed on the release sheet onto an optical film, and next curing it. Here, as the optical film, it is possible to use an optical film used for manufacturing various types of display devices or the like, types thereof are not particularly limited, and the optical film includes, for example, a polarizing film, a phase difference film, a brightness enhancing film, and an anti-glare sheet. Further, it is also possible for the optical film to have a configuration that at least two layers of optical materials are laminated with each other, such as a configuration that the polarizing film and the phase difference film are laminated, a configuration that the phase difference films are laminated, and a configuration that the polarizing film and the brightness enhancing film or the anti-glare sheet are laminated, For example, as shown in FIG. 1, the optical film according to the embodiment comprises a release sheet 4, a pressure-sensitive adhesive layer 3 comprising the pressure-sensitive adhesive composition according to the embodiment, an optical film material 2 disposed on the pressure-sensitive adhesive layer 3, and a protection film 1 disposed on the optical film material 2. In addition, as shown in FIG. 2, the optical film according to modification of the embodiment comprises a release sheet 4, a pressure-sensitive adhesive layer 3 comprising the pressure-sensitive adhesive composition according to the embodiment, an optical film material 2 disposed on the pressure-sensitive adhesive layer 3, a pressure-sensitive adhesive layer 5 further disposed on the optical film material 2, an optical film material 6 disposed on the pressure-sensitive adhesive layer 5 and a protection film 1 disposed on the optical film material 6.

As the release sheet, it is possible to use a plastic sheet such as polyester sheet to which releasing treatment is applied by using a releasing agent such as fluorine based resin, paraffin wax, and silicone. The thickness of pressure-sensitive adhesive layer formed on the release sheet is approximately controlled to, for example, 1 to 100 μm, preferably 5 to 50 μm, more preferably 15 to 30 μm, as a thickness after drying.

It is possible to dry the pressure-sensitive adhesive composition coated on the release sheet under the heating condition of approximately at 70 to 120 degrees C. for 1 to 3 minutes by a hot air drying machine.

It is possible to adjust the adhesion force of the pressure-sensitive adhesive composition according to the embodiment and the optical film to a body to be bonded so as to obtain a desired adhesion force, the optical film comprising the pressure-sensitive adhesive layer formed of the pressure-sensitive adhesive composition according to the embodiment, by adjusting the sort and amount of the reactive functional groups of the acrylic copolymer (A) and/or the acrylic copolymer (B), the isocyanate compound (C) and the like. The adhesion force of the pressure-sensitive adhesive composition and the optical film to the body to be bonded is controlled to, for example, 3N/25 mm to 35N/25 mm, preferably 3N/25 mm to 30N/25 mm, more preferably 8N/25 mm to 20N/25 mm.

(Liquid Crystal Display Device)

Figure 4:
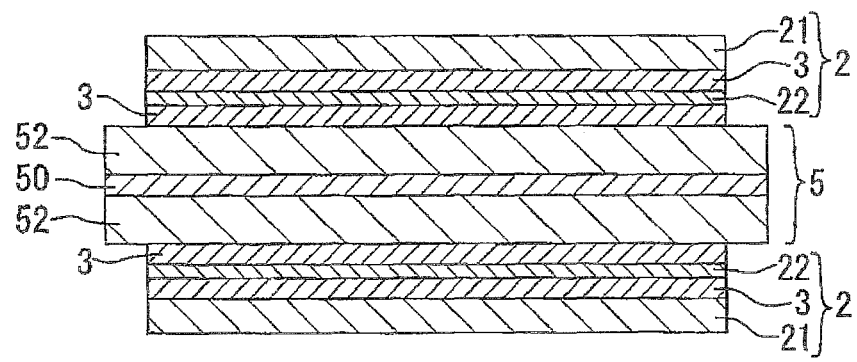
FIG. 4 is a sectional view schematically showing a liquid crystal display device according to modification of the embodiment.

FIG. 3 is a sectional view schematically showing a liquid crystal display device according to the embodiment and FIG. 4 is a sectional view schematically showing a liquid crystal display device according to modification of the embodiment.

The liquid crystal display device according to the embodiment is equipped with the optical film according to the embodiment. In addition, the liquid crystal display device can be manufactured by that the optical film according to the embodiment is laminated on one side or both sides of the liquid crystal cell via the pressure-sensitive adhesive layer that the optical film comprises. For example, as shown in FIG. 3, the liquid crystal display device can be manufactured by that an optical film material 2 formed of a polarizing film 21 and a reflecting layer 22 is laminated on one surface of a liquid crystal cell 5 via the pressure-sensitive adhesive layer 3 according to the embodiment, and the polarizing film 21 is laminated on another surface of the liquid crystal cell 5 via the pressure-sensitive adhesive layer 3. Further, the liquid crystal cell 5 has a structure that a liquid crystal layer 50 is sandwiched between predetermined substrates 52. Furthermore, as shown in FIG. 4, the other liquid crystal display device can be manufactured by that the optical film material 2 formed by that the polarizing film 21 and the reflecting layer 22 are laminated with each other via the pressure-sensitive adhesive layer 3 is laminated on both of one and another surfaces of the liquid crystal cell 5 respectively via the pressure-sensitive adhesive layer 3 according to the embodiment. The lamination is carried out in such a manner that the polarizing film, the phase difference film and the like are arranged in a predetermined location, and the location of arrangement can be determined in accordance with the conventional manner. Further, as the liquid crystal cell of the liquid crystal display device, it is possible to appropriately adopt, for example, a liquid crystal cell having a type such as TN type, STN type, and π type.

Advantages of the Embodiment

It is considered that the pressure-sensitive adhesive composition according to the embodiment and the optical film having the pressure-sensitive adhesive layer formed of the pressure-sensitive adhesive composition are comprised of the above-mentioned configuration, so that they have high cohesion force due to the chemical crosslinking by the reaction of the reactive functional groups of the acrylic copolymer (A) and the acrylic copolymer (B) with the crosslinking agent, and the physical crosslinking that the isocyanate groups of the isocyanate compound (C) not contributing to the crosslinking reaction react with water in the curing environment so as to form the multimeric complex, and the multimeric complex restrains the molecule chains of the acrylic copolymers and the crosslinked polymers formed of the copolymers from moving. Thus, the pressure-sensitive adhesive composition and the pressure-sensitive adhesive according to the embodiment are capable of achieving synergistically enhancement of cohesion force due to the crosslinking between the acrylic copolymers (A) with each other, increase in the gel fraction due to the crosslinking between the acrylic copolymers (B) with each other, retention of elasticity and elongation due to occurrence of intertwining in molecules and nets by the crosslinking between the acrylic copolymer (A) and the acrylic copolymer (B), and enhancement of coefficient of elasticity by the multimeric complex, so that they have good elasticity, following-up properties, and durability. Furthermore, the pressure-sensitive adhesive composition and the pressure-sensitive adhesive according to the embodiment are also excellent in a stress relaxation property due to the fact that a part of the physical crosslinking that restrains the molecule chains from moving has flowability, so that they can be applied to a pressure-sensitive adhesive composition, a pressure-sensitive adhesive and an optical film that are required to have durability and ability of inhibition of bright defect at a high level.

To put it plainly, the pressure-sensitive adhesive composition and the pressure-sensitive adhesive according to the embodiment are capable of forming the pseudo IPN structure by formation of the crosslinked copolymer due to the chemical crosslinking between the acrylic copolymer (A) and the acrylic copolymer (B), formation of the multimeric complex due to the isocyanate compound (C), and the physical crosslinking and the chemical crosslinking between the crosslinked copolymer and the multimeric complex, thereby they can have the excellent properties as described above, even though the IPN structure is not instantaneously formed different from a case that a crosslinking reaction of multifunctional monomers is carried out by UV curing. Further, in case that an auxiliary crosslinking agent other than the isocyanate compound such as an epoxy based compound is added to the pressure-sensitive adhesive composition according to the embodiment, the elongation and stress of the pressure-sensitive adhesive composition and the pressure-sensitive adhesive can be controlled due to the crosslinking between the acrylic copolymers (A) with each other.

Namely, in the pressure-sensitive adhesive composition according to the embodiment, the acrylic copolymer (A) and the acrylic copolymer (B) having a predetermined elongation at break in the tensile test in case that the crosslinking film is fabricated by performing a predetermined treatment are used, and simultaneously the isocyanate compound (C) is used in such an amount that the equivalent of the isocyanate group of the isocyanate compound (C) becomes larger than the total equivalent of the reactive functional groups of the acrylic copolymer (A) and the acrylic copolymer (B), so that the multimeric complex is produced, the multimeric complex being derived from not only the chemical crosslinking due to the reaction between the reactive functional groups of the acrylic copolymer (A) and the acrylic copolymer (B) and the crosslinking agent, but also the isocyanate compound (C) having the isocyanate group that does not react with the acrylic copolymer (A) and/or the acrylic copolymer (B) of the isocyanate compound (C) added to the acrylic copolymer (A) and the acrylic copolymer (B). Thereby, the pressure-sensitive adhesive composition according to the embodiment has a structure that the multimeric complex of the isocyanate compound (C) exists in the intertwining structure of the molecule chains produced by the chemical crosslinking due to the reaction between the reactive functional groups of the acrylic copolymer (A) and the acrylic copolymer (B) and the crosslinking agent. Consequently, the pressure-sensitive adhesive composition according to the embodiment has the pseudo IPN structure, and simultaneously the multimeric complex is inhomogeneously dispersed in the pseudo IPN structure, so that for example, good transparency to a visible light can be ensured and simultaneously durability and ability of inhibition of bright defect can be realized at a high level.

EXAMPLES

Hereinafter, Examples, Comparative Examples and Referential Examples will be explained. Further, fabrication of test samples used in Examples, Comparative Examples and Referential Examples, and various types of test method and evaluation method are as follows.

(1) Fabrication of Optical Film for Test

As an example of the optical film, a polarizing film having a pressure-sensitive adhesive layer was fabricated by using a polarizing film. A pressure-sensitive adhesive composition was coated on a release film of which surface was treated by a silicone based releasing agent in such a manner that a coating amount becomes 25 g/m$^2$ after drying. Next, drying was carried out by a hot air circulation type drying machine at 100 degrees C. for 90 seconds, so as to form a pressure-sensitive adhesive layer. Subsequently, the surface of pressure-sensitive adhesive layer was laminated on the rear surface of a polarizing base film [having a structure that triacetate cellulose (TAC) films are laminated on both surfaces of a polarizer having a polyvinyl alcohol (PVA) film as the main part; approximately 190 μm], and pressure bonding was carried out by passing between pressure nip rollers. After pressure bonding, curing was carried out for 10 days under the environment of 23 degrees C. and 50% relative humidity (RH), so as to obtain a polarizing film having a pressure-sensitive adhesive layer.

(2) Measurement of Adhesive Force

The polarizing film fabricated in the above-mentioned "(1) Fabrication of optical film for test" was cut out to be 25 mm×150 mm, and then the polarizing film piece was bonded under pressure to an alkali free glass plate having a thickness of 0.7 mm manufactured by Corning Incorporated, and sold under a trade name of "#1737" by using a desk lamination machine, so as to prepare test samples. The test samples were subjected to autoclave treatment (50 degrees C., 5 kg/cm$^2$, and 20 minutes). Next, the samples were left for 24 hours under the condition of 23 degrees C. and 50% relative humidity (RH), and then adhesion force in 180 degrees peel (peeling speed: 300 mm/minute) was measured.

(3) Evaluation of Heat Resistance and Heat Humidity Resistance

The polarizing film fabricated in the above-mentioned "(1) Fabrication of optical film for test" was cut out in such a condition that the long side has an angle of 45 degrees to an absorption axis, so as to form a test piece of 140 mm×260 mm (long side), and the test pieces were laminated on one surface of the alkali free glass plate "#1737" of 0.7 mm manufactured by Corning Incorporated by using a laminating machine. Next, the samples were subjected to autoclave treatment (50 degrees C., 5 kg/cm$^2$, and 20 minutes) and were left for 24 hours under the condition of 23 degrees C. and 50% relative humidity (RH), so as to be test samples. The test samples were fabricated for an evaluation of heat resistance and an evaluation of heat humidity resistance respectively. After that, test samples for the evaluation of heat resistance were left for 1,000 hours under the temperature condition of 80 degrees C., and heat resistance was evaluated by visually observing a state of occurrence of air bubbles, separation, and floating. In addition, test samples for the evaluation of heat humidity resistance were left for 1,000 hours under the condition of 60 degrees C. and 90% relative humidity (RH), and heat humidity resistance was evaluated by visually observing a state of occurrence of air bubbles, separation, and floating. The basis for evaluation is as follows.

(Basis for Evaluation of Heat Resistance)

a) Occurrence of Air Bubbles

⊚: occurrence of air bubbles is not observed at all

○: occurrence of air bubbles is hardly observed

Δ: occurrence of air bubbles is somewhat observed partially

X: occurrence of air bubbles is remarkably observed overall b) Separation

⊚: no separation

○: separation of not more than 0.3 mm

X: separation of more than 0.3 mm (Basis for Evaluation of Heat Humidity Resistance)

a) Occurrence of Air Bubbles

⊚: occurrence of air bubbles is not observed at all

○: occurrence of air bubbles is hardly observed

Δ: occurrence of air bubbles is somewhat observed partially

X: occurrence of air bubbles is remarkably observed overall b) Separation

⊚: separation is not observed

○: separation is not more than 0.3 mm

X: separation is more than 0.3 mm (4) Evaluation Test of Bright Defect Phenomenon The polarizing film fabricated in the above-mentioned "(1) Fabrication of optical film for test" was cut out in such a condition that the long side has an angle of 45 degrees to an absorption axis, so as to form a test piece of 12 inch size, namely 140 mm×260 mm (long side), and the test pieces were laminated on both surfaces of the alkali free glass plate "#1737" of 0.7 mm manufactured by Corning Incorporated in such a manner that the polarizing axes of the polarizing film having the pressure-sensitive adhesive layer are at right angles to each other, so as to fabricate test samples. Next, the samples were subjected to autoclave treatment (50 degrees C., 5 kg/cm$^2$, and 20 minutes) and were left for 24 hours under the condition of 23 degrees C. and 50% relative humidity (RH). After that, they were left for 500 hours under the condition of 80 degrees C. and dry. After being left, the state of bright defect was observed visually by using a uniform light source under the condition of 23 degrees C. and 50% relative humidity (RH). The basis for evaluation is as follows.

(Basis for Evaluation of Bright Defect Phenomenon)

⊚: bright defect is not observed at all

○: bright defect is hardly observed

X: large bright defect is observed (5) Evaluation Test of Pot Life

The pressure-sensitive adhesive composition was diluted with methyl ethyl ketone in such a manner that viscosity at 25 degrees C. becomes 1,800 to 2,000 mPa·s, so as to obtain a pressure-sensitive adhesive composition solution. And, the obtained was stored at 23 degrees C., and storage time was confirmed, the storage time meaning a time period during which it is possible to coat the pressure-sensitive adhesive composition solution uniformly without occurrence of white turbidity and unevenness of coating in the coated film formed by coating the pressure-sensitive adhesive composition solution. The basis for evaluation is as follows. Further, the coated film was obtained by that the pressure-sensitive adhesive composition solution after storage was coated on a releasing film of which surface was treated by a silicone based releasing agent in such a manner that a coating amount becomes 25 g/m$^2$ after drying, and then drying was carried out by a hot air circulation type drying machine at 100 degrees C. for 90 seconds.

(Basis for Evaluation of Pot Life)

1: not less than 24 hours

2: not less than 10 hours and less than 24 hours

3: not less than 3 hours and less than 10 hours

4: less than 3 hours (6) Evaluation Test of Compatibility of Pressure-Sensitive Adhesive The pressure-sensitive adhesive composition was coated on a releasing film of which surface was treated by a silicone based releasing agent in such a manner that a coating amount becomes 25 g/m² after drying. Next, drying was carried out by a hot air circulation type drying machine at 100 degrees C. for 90 seconds, so as to form a pressure-sensitive adhesive layer. Subsequently, the surface of the pressure-sensitive adhesive layer was laminated on a polyethylene terephthalate film (50 μm). After lamination, curing was carried out for 10 days under the environment of 23 degrees C. and 50% relative humidity (RH), the releasing film was separated, cloudy conditions was observed visually and then an evaluation was performed as follows.

(Basis for Evaluation of Compatibility)
○: cloud is not observed
Δ: cloud is slightly observed
X: cloud is observed (Manufacturing of Acrylic Copolymer (A))

Manufacturing Example 1

99 parts by weight of n-butylacrylate (BA), 1 part by weight of acrylic acid (AA), 100 parts by weight of ethyl acetate (EAc) and 0.2 part by weight of azobisisobutylonitrile (AIBN) were introduced into a reactor vessel equipped with a thermometer, a stirrer, a nitrogen introduction tube and a reflux cooling tube, and nitrogen gas was substituted for air in the reactor vessel, and then a content temperature was elevated to 65 degrees C. and reaction was carried out for 6 hours in a nitrogen atmosphere by stirring, and further, the content temperature was elevated to 70 degrees C. and the reaction was carried out for 2 hours. After that, a solution obtained by that 0.4 part by weight of AIBN was dissolved with 20 parts by weight of EAc was dropped thereinto for 1 hour, and furthermore the reaction was carried out for 2 hours. After completion of the reaction, the reaction mixture was diluted with toluene, so as to obtain an acrylic copolymer solution that has solid content of 15.30% by weight and viscosity of 6,600 mPa·s. The weight-average molecular weight of the acrylic copolymer (A) according to manufacturing example 1 was 1,690,000.

(Manufacturing of Acrylic Copolymer (B))

Manufacturing Example 8

83.5 parts by weight of n-butylacrylate (BA), 15 parts by weight of t-butylacrylate (t-BA), 1 part by weight of acrylic acid (AA), 0.5 part by weight of 2-hydroxyethylacrylate (2HEA), 100 parts by weight of ethyl acetate (EAc) and 0.2 part by weight of azobisisobutylonitrile (AIBN) were introduced into a reactor vessel equipped with a thermometer, a stirrer, a nitrogen introduction tube and a reflux cooling tube, and nitrogen gas was substituted for air in the reactor vessel, and then a content temperature was elevated to 65 degrees C. and reaction was carried out for 6 hours in a nitrogen atmosphere by stirring, and further, the content temperature was elevated to 70 degrees C. and the reaction was carried out for 2 hours. After that, a solution obtained by that 0.4 part by weight of AIBN was dissolved with 20 parts by weight of EAc was dropped thereinto for 1 hour, and furthermore the reaction was carried out for 2 hours. After completion of the reaction, the reaction mixture was diluted with toluene, so as to obtain an acrylic copolymer solution that has solid content of 17.40% by weight and viscosity of 11,600 mPa·s. The weight-average molecular weight of the acrylic copolymer (C) according to manufacturing example 8 was 1,730,000.

Other Manufacturing Examples

Polymerization was carried out in the same manner as manufacturing example 1 except that a monomer composition shown in Table 1 and Table 2 was used for the copolymer composition instead of the copolymer composition used in manufacturing example 1. Table 1 and Table 2 show a copolymer composition, a solid content, a glass-transition temperature (Tg), a solubility parameter (SP value), a weight-average molecular weight (Mw), a viscosity (mPa·s), an elongation at break of a crosslinking film in which 1 equivalent of Coronate L (the isocyanate compound (C)) was added, with regard to each example.

TABLE 1

| | Item | | MfgEx 1[*2] | MfgEx 2 | MfgEx 3 | MfgEx 4 | MfgEx 5 | MfgEx 6 | MfgEx 7 |
|---|---|---|---|---|---|---|---|---|---|
| Acrylic copolymer (A) | Main monomer | BA (part by weight) | 99 | 97 | 95 | 98 | 98 | 97.5 | 97.5 |
| | Carboxyl group containing monomer | AA (part by weight) | 1 | 3 | 5 | 2 | 2 | 0.5 | 0.5 |
| | Hydroxyl group containing monomer | 2HEA (part by weight) | 0 | 0 | 0 | 0 | 0 | 2 | 2 |
| | Properties value | Mw ($10^4$) | 169 | 172 | 155 | 116 | 90 | 161 | 78 |
| | | Solid content (%) | 15.3 | 22.68 | 18.87 | 20.2 | 22.5 | 17.9 | 21.9 |
| | | Viscosity (mPa·s) | 6600 | 51400 | 11320 | 6760 | 5940 | 16880 | 3100 |
| | | $Tg_A$ (degrees C.) | −55 | −51 | −47 | −53 | −53 | −55 | −55 |
| | | SP value ($J^{1/2}/cm^{3/2}$) | 20.14 | 20.44 | 20.74 | 20.29 | 20.29 | 20.28 | 20.28 |
| | Tensile test | Coronate L at 1 equivalent (part by weight)[*1] | 3.3 | 10 | 16.6 | 6.7 | 6.7 | 5.8 | 5.8 |
| | | Elongation at break (%) | 1410 | 940 | 650 | 1350 | 1640 | 200 | 220 |

[*1]Parts by weight of active component of Coronate L per 100 parts by weight of Acrylic copolymer (A)
[*2]MfgEx 1 = Manufacturing example 1

TABLE 2

| Item | | | MfgEx 8[*3] | MfgEx 9 | MfgEx 10 | MfgEx 11 | MfgEx 12 | MfgEx 13 | MfgEx 14 | MfgEx 15 |
|---|---|---|---|---|---|---|---|---|---|---|
| Acrylic copolymer (B) | Main monomer | BA (part by weight) | 83.5 | 83.5 | 83 | 83.5 | 83.5 | 84 | 83.5 | 100 |
| | | t-BA (part by weight) | 15 | 0 | 15 | 15 | 15 | 15 | 15 | 0 |
| | | MA[*1] (part by weight) | 0 | 15 | 0 | 0 | 0 | 0 | 0 | 0 |
| | Carboxyl group containing monomer | AA (part by weight) | 1 | 1 | 1 | 1 | 1 | 1 | 1 | 0 |
| | Hydroxyl group containing monomer | 2HEA (part by weight) | 0.5 | 0.5 | 1 | 0.5 | 0.5 | 0 | 0.5 | 0 |
| | Properties value | Mw ($10^4$) | 173 | 136 | 189 | 110 | 91 | 153 | 73 | 159 |
| | | Solid content (%) | 17.4 | 19.5 | 19.04 | 19.1 | 22.9 | 21.7 | 21.4 | 19 |
| | | Viscosity (mPa·s) | 11600 | 7400 | 19800 | 3290 | 3750 | 20200 | 2140 | 9300 |
| | | $Tg_B$ (degrees C.) | −45 | −44 | −45 | −45 | −45 | −45 | −45 | −57 |
| | | SP value ($J^{1/2}/cm^{3/2}$) | 20.07 | 20.51 | 20.12 | 20.07 | 20.07 | 20.02 | 20.07 | 19.99 |
| | Tensile test | Coronate L at 1 equivalent (part by weight)[*2] | 4.4 | 4.4 | 5.4 | 4.4 | 4.4 | 3.3 | 4.4 | — |
| | | Elongation at break (%) | 430 | 420 | 210 | 430 | 460 | 1240 | 490 | — |

[*1]MA: Methyl acrylate
[*2]Parts by weight of active component of Coronate L per 100 parts by weight of Acrylic copolymer (B)
[*3]MfgEx 8 = Manufacturing example 8

(Manufacturing of Pressure-Sensitive Adhesive Composition for Optical Film)

Example 1

As shown in Table 3; 556 parts by weight (however 85 parts by weight as an active component) of the acrylic copolymer (A) solution manufactured by manufacturing example 1 and 86 parts by weight (however 15 parts by weight as an active component) of the acrylic copolymer (B) solution manufactured by manufacturing example 8 were mixed, in such a manner that blend ratio of the acrylic copolymer (A) and the acrylic copolymer (B) becomes 85:15, and simultaneously 18.7 parts by weight of Coronate L (polyisocyanate compound manufactured by Nippon Polyurethane Industry Co., Ltd., 14 parts by weight as active component, an amount of isocyanate group per equivalent of the total reactive functional groups of the acrylic copolymer (A) and the acrylic copolymer (B) is 4.03 equivalent (further, described as "NCO/resin functional group" in Tables 3 to 5)) as the isocyanate compound (C), 0.02 part by weight of TETRAD-X (manufactured by Mitsubishi Gas Chemical Company Inc., 100% by weight as an active component) as an epoxy compound, and 0.1 parts by weight of 3-glycydoxypropyltrimethoxysilane (silane compound manufactured by Shin-Etsu Chemical Co., Ltd., sold under a trade name of "KBM-403", 0.1 parts by weight as an active component) as a silane compound were added to the mixture and stirring and mixing were sufficiently carried out, so as to obtain the pressure-sensitive adhesive composition according to Example 1.

Other Examples, Comparative Examples, and Referential Examples

Pressure-sensitive adhesive compositions (namely, the pressure-sensitive adhesive compositions according to Examples 2 to 11, Comparative Examples 1 to 6, and Referential Example) were manufactured in the same manner as Example 1 except that the composition of each Example shown in Table 3 to 5 was adopted instead of the composition used in Example 1. Optical films for test were fabricated in accordance with the above-mentioned fabricating method of the optical film for test by using the pressure-sensitive adhesive compositions obtained, and the above-mentioned various types of measurements were carried out. The result of each Example is shown in Tables 3 to 5.

TABLE 3

| Item | | | Ex. 1[*1] | Ex. 2 | Ex. 3 | Ex. 4 | Ex. 5 | Ex. 6 | Ex. 7 |
|---|---|---|---|---|---|---|---|---|---|
| Resin | Acrylic copolymer (A) | Sort | MfgEx 1[*2] | MfgEx 2 | MfgEx 3 | MfgEx 1 | MfgEx 1 | MfgEx 1 | MfgEx 1 |
| | | Additive amount (parts by weight) | 85 | 90 | 90 | 85 | 95 | 85 | 85 |
| | Acrylic copolymer (B) | Sort | MfgEx 8 | MfgEx 9 | MfgEx 9 | MfgEx 8 | MfgEx 10 | MfgEx 8 | MfgEx 8 |
| | | Additive amount (parts by weight) | 15 | 10 | 10 | 15 | 5 | 15 | 15 |
| Crosslinking agent | Coronate L (Isocyanate compound (C)) | Additive amount (parts by weight) | 14 | 14 | 14 | 14 | 14 | 20 | 10 |
| | | NCO/resin functionl group | 4.03 | 1.59 | 1.02 | 4.03 | 4.09 | 5.75 | 2.88 |
| | TETRAD-X (Epoxy compound) | Additive amount (parts by weight) | 0.02 | 0 | 0 | 0 | 0 | 0.02 | 0.02 |
| Silane compound | KBM-403 | Additive amount (parts by weight) | 0.1 | 0.1 | 0.1 | 0.1 | 0.1 | 0.1 | 0.1 |
| pressure-sensitive | | Gel fraction (%) | 82 | 91 | 86 | 82 | 83 | 87 | 80 |

TABLE 3-continued

| | Item | | Ex. 1[*1] | Ex. 2 | Ex. 3 | Ex. 4 | Ex. 5 | Ex. 6 | Ex. 7 |
|---|---|---|---|---|---|---|---|---|---|
| adhesive properties | Adhesion force (N/25 mm) | | 17 | 25 | 32 | 15 | 15 | 9 | 21 |
| | Tensile test | Elongation at break (%) | 650 | 520 | 500 | 650 | 630 | 560 | 625 |
| | | 200% modulus (N/mm$^2$) | 1.3 | 1.8 | 2.1 | 1.3 | 1.4 | 1.8 | 0.4 |
| | Heat resistance (80 degrees C., 12 inches) | Occurrence of air bubbles | ◎ | ◎ | ◎ | ○ | ◎ | ◎ | ◎ |
| | | Separation | ◎ | ◎ | ○ | ◎ | ○ | ◎ | ◎ |
| | Heat humidity resistance (60 degrees C., 90% RH, 12 inches) | Occurrence of air bubbles | ◎ | ◎ | ◎ | ◎ | ◎ | ◎ | ◎ |
| | | Separation | ◎ | ◎ | ○ | ◎ | ◎ | ◎ | ◎ |
| | Bright, defect (12 inches) | | ◎ | ◎ | ◎ | ◎ | ◎ | ◎ | ◎ |
| | Pot life | | 1 | 2 | 3 | 1 | 1 | 1 | 1 |
| | Compatibility | | ○ | ○ | ○ | ○ | ○ | ○ | ○ |

[*1] EX. 1 = Example 1
[*2] MfgEx 1 = Manufacturing example 1

TABLE 4

| | Item | | Ex. 8[*1] | Ex. 9 | Ex. 10 | Ex. 11 | Ex. 12 | CoEx. 1[*2] | CoEx. 2 |
|---|---|---|---|---|---|---|---|---|---|
| Resin | Acrylic copolymer (A) | Sort | MfgEx 1[*3] | MfgEx 4 | MfgEx 4 | MfgEx 5 | MfgEx 1 | MfgEx 1 | MfgEx 1 |
| | | Additive amount (parts by weight) | 85 | 85 | 60 | 85 | 85 | 85 | 85 |
| | Acrylic copolymer (B) | Sort | MfgEx 8 | MfgEx 11 | MfgEx 11 | MfgEx 12 | MfgEx 13 | MfgEx 8 | MfgEx 8 |
| | | Additive amount (parts by weight) | 15 | 15 | 40 | 15 | 15 | 15 | 15 |
| Crosslinking agent | Coronate L (Isocyanate compound (C)) | Additive amount (parts by weight) | 6 | 14 | 14 | 14 | 14 | 3 | 35 |
| | | NCO/resin functionl group | 1.73 | 2.22 | 2.44 | 2.22 | 4.21 | 0.86 | 10.07 |
| | TETRAD-X (Epoxy compound) | Additive amount (parts by weight) | 0.02 | 0.02 | 0.02 | 0.02 | 0.02 | 0.02 | 0.02 |
| Silane compound | KBM-403 | Additive amount (parts by weight) | 0.1 | 0.1 | 0.1 | 0.1 | 0.1 | 0.1 | 0.1 |
| pressure-sensitive adhesive properties | Gel fraction (%) | | 76 | 85 | 88 | 75 | 77 | 68 | 92 |
| | Adhesion force (N/25 mm) | | 26 | 21 | 15 | 22 | 19 | 28 | 0.1 |
| | Tensile test | Elongation at break (%) | 810 | 570 | 390 | 900 | 930 | 1100 | 380 |
| | | 200% modulus (N/mm$^2$) | 0.2 | 1.6 | 1.8 | 1 | 1.2 | 0.1 | 5.6 |
| | Heat resistance (80 degrees C., 12 inches) | Occurrence of air bubbles | ◎ | ◎ | ◎ | ◎ | △ | ◎ | ◎ |
| | | Separation | ○ | ◎ | ○ | ◎ | ○ | ○ | X |
| | Heat humidity resistance (60 degrees C., 90% RH, 12 inches) | Occurrence of air bubbles | ◎ | ◎ | ◎ | ◎ | ◎ | ◎ | ◎ |
| | | Separation | ◎ | ◎ | ○ | ◎ | ○ | ○ | X |
| | Bright defect (12 inches) | | ○ | ◎ | ◎ | ◎ | ○ | X | —[*4] |
| | Pot life | | 1 | 1 | 1 | 1 | 1 | 1 | 3 |
| | Compatibility | | ○ | ○ | ○ | ○ | ○ | ○ | ○ |

[*1] EX. 8 = Example 8,
[*2] CoEx. 1 = Comparative Example 1
[*3] MfgEx 1 = Manufacturing example 1
[*4] Unmeasurable due to separation

TABLE 5

| | Item | | Co Ex. 3[*1] | Co Ex. 4 | Co Ex. 5 |
|---|---|---|---|---|---|
| Resin | Acrylic copolymer (A) | Sort | Mfg Ex 6[*2] | Mfg Ex 7 | Mfg Ex 1 |
| | | Additive amount (parts by weight) | 85 | 85 | 85 |
| | Acrylic copolymer (B) | Sort | Mfg Ex 8 | Mfg Ex 14 | Mfg Ex 15 |
| | | Additive amount (parts by weight) | 15 | 15 | 15 |
| Crosslinking agent | Coronate L (Isocyanate compound (C)) | Additive amount (parts by weight) | 14 | 14 | 14 |
| | | NCO/resin functionl group | 2.73 | 2.73 | 4.96 |
| | TETRAD-X (Epoxy compound) | Additive amount (parts by weight) | 0.02 | 0.02 | 0.02 |

TABLE 5-continued

| Item | | | Co Ex. 3*¹ | Co Ex. 4 | Co Ex. 5 |
|---|---|---|---|---|---|
| Silane compound | KBM-403 | Additive amount (parts by weight) | 0.1 | 0.1 | 0.1 |
| pressure-sensitive adhesive properties | | Gel fraction (%) | 97 | 93 | 72 |
| | | Adhesion force (N/25 mm) | 4 | 5 | 18 |
| | Tensile test | Elongation at break (%) | 190 | 210 | 1010 |
| | | 200% modulus (N/mm²) | 3.9 | 3.4 | 0.8 |
| | Heat resistance (80 degrees C., 12 inches) | Occurrence of air bubbles | ◎ | ◎ | X |
| | | Separation | X | X | ○ |
| | Heat humidity resistance (60 degrees C., 90% RH, 12 inches) | Occurrence of air bubbles | ◎ | ◎ | ◎ |
| | | Separation | X | X | ○ |
| | | Bright defect (12 inches) | ◎ | ◎ | ○ |
| | | Pot life | 1 | 1 | 1 |
| | | Compatibility | ○ | ○ | ○ |

*¹Co Ex. 3 = Comparative Example 3
*²Mfg Ex 6 = Manufacturing example 6

Further, abbreviation of each composition in Tables 1 to 5 is as follows, and additive amount of each component is shown by a part by weight of active component.

Coronate L: tolylene diisocyanate adduct of trimethylol propane manufactured by Nippon Polyurethane Industry Co., Ltd., active component 75% by weight, the isocyanate compound (C)

KBM-403: silane compound manufactured by Shin-Etsu Chemical Co., Ltd., trade name: KBM-403, chemical name: 3-glycydoxypropyltrimethoxysilane, active component 100% by weight, silane compound TETRAD-X: epoxy compound manufactured by Mitsubishi Gas Chemical Company Inc., trade name: TETRAD-X, chemical name: N,N,N',N'-tetraglycidyl-m-xylylenediamine, active component: 100% by weight, epoxy compound Further, the optical film having the pressure-sensitive adhesive for optical film according to the embodiment and Examples has good durability and is capable of inhibiting bright defect, thus it can be applied to an optical film used for a display device such as a personal computer, a television, and a car navigation.

Hereinbefore, the embodiment and Examples of the present invention has been explained, but the above-mentioned embodiment and Examples do not restrict the invention according to scope of claim for patent. Also, it should be noted that all of the combinations of features explained in the embodiment and Examples are not absolutely necessary for means for solving the problem of the invention.

The invention claimed is:

1. A pressure-sensitive adhesive composition comprising an acrylic copolymer (A) and an acrylic copolymer (B) that have a reactive functional group respectively, and an isocyanate compound (C), wherein the isocyanate compound (C) is added in an amount of 6 to 30 parts by weight per 100 parts by weight of a mixture of the acrylic copolymer (A) and the acrylic copolymer (B), wherein the acrylic copolymer (A) contains 0.5 to 5% by weight of a carboxyl group containing monomer containing a carboxyl group as the reactive functional group, and not more than 1% by weight of a hydroxyl group containing monomer containing a hydroxyl group as the reactive functional group, as a component of the copolymer,
wherein the acrylic copolymer (B) contains 0.1 to 5% by weight of a carboxyl group containing monomer containing a carboxyl group as the reactive functional group, and 0.3 to 5% by weight of a hydroxyl group containing monomer containing a hydroxyl group as the reactive functional group, as components of the copolymer, wherein the acrylic copolymer (A) and the acrylic copolymer (B) are contained in a weight ratio of 60/40 to 99/1.

2. The pressure-sensitive adhesive composition according to claim 1, wherein each of the acrylic copolymer (A) and the acrylic copolymer (B) has weight-average molecular weight of 900,000 to 2,500,000.

3. The pressure-sensitive adhesive composition according to claim 1, wherein the difference between the solubility parameter ($SP_A$) of acrylic copolymer (A) and the solubility parameter ($SP_B$) of acrylic copolymer (B) is −0.5 to 0.5.

4. The pressure-sensitive adhesive composition according to claim 3, wherein the relation between the glass-transition temperature ($Tg_A$) of acrylic copolymer (A) and the glass-transition temperature ($Tg_B$) of acrylic copolymer (B) satisfies $Tg_A < Tg_B$.

5. The pressure-sensitive adhesive composition according to claim 4, wherein the composition further contains an epoxy based crosslinking agent and an aziridine based crosslinking agent.

6. A pressure-sensitive adhesive comprising the pressure-sensitive adhesive composition according to claim 1.

7. An optical film having a pressure-sensitive adhesive layer formed from the pressure-sensitive adhesive composition according to claim 1.

8. A liquid crystal display device being equipped with the optical film according to claim 7.

9. The pressure-sensitive adhesive composition according to claim 1, wherein the isocyanate compound (C) is added in an amount of 10 to 30 parts by weight per 100 parts by weight of the mixture of the acrylic copolymer (A) and the acrylic copolymer (B).

10. The pressure-sensitive adhesive composition according to claim 1, wherein the isocyanate compound (C) is added in an amount of 14 to 30 parts by weight per 100 parts by weight of the mixture of the acrylic copolymer (A) and the acrylic copolymer (B).

11. The pressure-sensitive adhesive composition according to claim 1, wherein a pressure-sensitive adhesive layer is formed from the pressure-sensitive adhesive composition, and has the elongation at break and 200% modulus as determined at 25 degrees C. by the tensile test that are 300 to 1000% and 0.2 to 3 N/mm² respectively.

* * * * *